(12) United States Patent
Ziebold et al.

(10) Patent No.: US 11,142,237 B2
(45) Date of Patent: Oct. 12, 2021

(54) TILT STEERING ASSEMBLY FOR A VEHICLE

(71) Applicant: Honda Motor Co., Ltd., Tokyo (JP)

(72) Inventors: Caleb Ziebold, Bellefontaine, OH (US); Junichi Nakano, Saitama (JP); Surya Phani Krishna Nukala, Novi, MI (US)

(73) Assignee: Honda Motor Co., Ltd., Tokyo (JP)

( * ) Notice: Subject to any disclaimer, the term of this patent is extended or adjusted under 35 U.S.C. 154(b) by 25 days.

(21) Appl. No.: 16/742,235

(22) Filed: Jan. 14, 2020

(65) Prior Publication Data

US 2021/0213999 A1 Jul. 15, 2021

(51) Int. Cl.
 *B60R 13/02* (2006.01)
 *B62D 1/187* (2006.01)
 *B60R 13/08* (2006.01)

(52) U.S. Cl.
 CPC .............. *B62D 1/187* (2013.01); *B60R 13/02* (2013.01); *B60R 13/08* (2013.01); *Y10T 428/24314* (2015.01)

(58) Field of Classification Search
 None
 See application file for complete search history.

(56) References Cited

U.S. PATENT DOCUMENTS

| 8,590,931 | B2 | 11/2013 | Brant et al. |
| 9,644,749 | B2 | 5/2017 | Lichtenberg |
| 9,752,684 | B2 | 9/2017 | Allen et al. |
| 2017/0253263 | A1 | 9/2017 | Iyanagi |
| 2018/0201297 | A1 | 7/2018 | Rey |
| 2019/0054949 | A1 | 2/2019 | Soderlind et al. |

FOREIGN PATENT DOCUMENTS

| CN | 207015281 | 2/2018 |
| DE | 2922425 | 12/1980 |
| DE | 10141458 | 3/2003 |
| DE | 102011004145 | 8/2012 |
| EP | 753447 | 9/2001 |
| EP | 1868869 | 8/2009 |
| JP | 2005178686 | 7/2005 |
| JP | 2005329900 | 12/2005 |
| JP | 2011057004 | 3/2011 |
| JP | 5210678 | 6/2013 |
| KR | 200160328 | 11/1999 |
| KR | 100569340 | 4/2006 |
| WO | 2018110764 | 6/2018 |

*Primary Examiner* — Alexander S Thomas
(74) *Attorney, Agent, or Firm* — Mark E. Duell; Rankin Hill & Clark LLP

(57) ABSTRACT

A tilt steering assembly includes an adjustable steering column and a damper connected to the steering column for maintaining the steering column position relative to an instrument panel. A column cover partially covers the steering column and the damper. The column cover includes a lower skirt, a cover member partially closing an opening defined by the lower skirt and the instrument panel for the steering column and damper, and a seal member provided beneath the cover member. The steering column and damper extend through the cover member. The seal member is fitted over the damper and includes an opening sized to receive the column cover. During adjustment of the steering column, the cover member is configured to flex outwardly creating a gap for movement of the steering column and damper, and the seal member is configured to press against an inner surface of the cover member to close the gap.

14 Claims, 6 Drawing Sheets

TILT STEERING ASSEMBLY FOR A VEHICLE

BACKGROUND

A tilting-type or a telescopic-type steering column for a vehicle, for example, a four-wheel-drive off-road vehicle, allows an angle and position of a steering wheel to be adjusted for a build of a driver. The steering column is typically covered by a steering column cover positioned adjacent to both an instrument panel and a lower supporting structure, for example, a lower driver side panel. The steering column cover can include a lower skirt and a cover member that extends from the lower skirt to the instrument panel to partially close an opening defined by the lower skirt and the instrument panel for the steering column. When the steering column is adjusted, the size of a gap between the cover member and the steering column increases or decreases, which can present quality perception issues.

BRIEF DESCRIPTION

According to one aspect, a tilt steering assembly for a vehicle comprises a steering column a position of which is adjustable relative to an instrument panel in one of a vehicle front-rear direction and a vehicle up-down direction. A damper is connected to the steering column for maintaining the position of the steering column relative to the instrument panel. A column cover at least partially covers the steering column and the damper. The column cover includes a lower skirt connected to the instrument panel, a flexible cover member that extends from the lower skirt to the instrument panel to partially close an opening defined by the lower skirt and the instrument panel for the steering column and damper, and a seal member provided beneath the cover member. The steering column and damper extend through the cover member. The seal member is fitted over the damper and includes an opening sized to receive the column cover. During adjustment of the steering column the cover member is configured to flex outwardly creating a gap for movement of the steering column and damper through cover member, and the seal member is configured to press against an inner surface of the cover member to close the gap created by the flexing of the cover member.

According to another aspect, a column cover for a tilt steering assembly for a vehicle is provided. The tilt steering assembly includes an adjustable steering column and a damper connected to the steering column for maintaining a position of the steering column relative to an instrument panel. The column cover comprises a flexible cover member and a seal member provided beneath the cover member. The cover member includes an aperture elongated in a length dimension of the cover member. The aperture is sized to receive therethrough both the steering column and the damper. The seal member is configured to be fitted over the damper and includes an opening sized to receive the column cover. The cover member is configured to flex outwardly creating a gap for movement of the steering column and damper through cover member, and the seal member is configured to press against an inner surface of the cover member to close the gap created by the flexing of the cover member.

According to another aspect, a vehicle assembly comprises an instrument panel and a steering column housing a steering shaft. A position of the steering column is adjustable relative to the instrument panel in one of a vehicle front-rear direction and an up-down direction. A damper is connected to the steering column for maintaining the position of the steering column relative to the instrument panel. A column cover at least partially covers the steering column and the damper. The column cover includes a lower skirt connected to the instrument panel, a flexible cover member that extends from the lower skirt to the instrument panel to partially close an opening defined by the lower skirt and the instrument panel for the steering column and damper, and a seal member provided beneath the cover member. The flexible cover member includes an aperture elongated in a length dimension of the cover member and at least one slit provided as an extension of the aperture. The aperture is sized to receive therethrough both the steering column and the damper. The seal member is fitted over the damper and includes an opening sized to receive the column cover. During adjustment of the steering column the cover member is configured to flex outwardly at the at least one slit creating a gap for movement of the steering column and damper through cover member, and the seal member is configured to press against an inner surface of the cover member to close the gap created by the flexing of the cover member.

DETAILED DESCRIPTION

Figure 1:
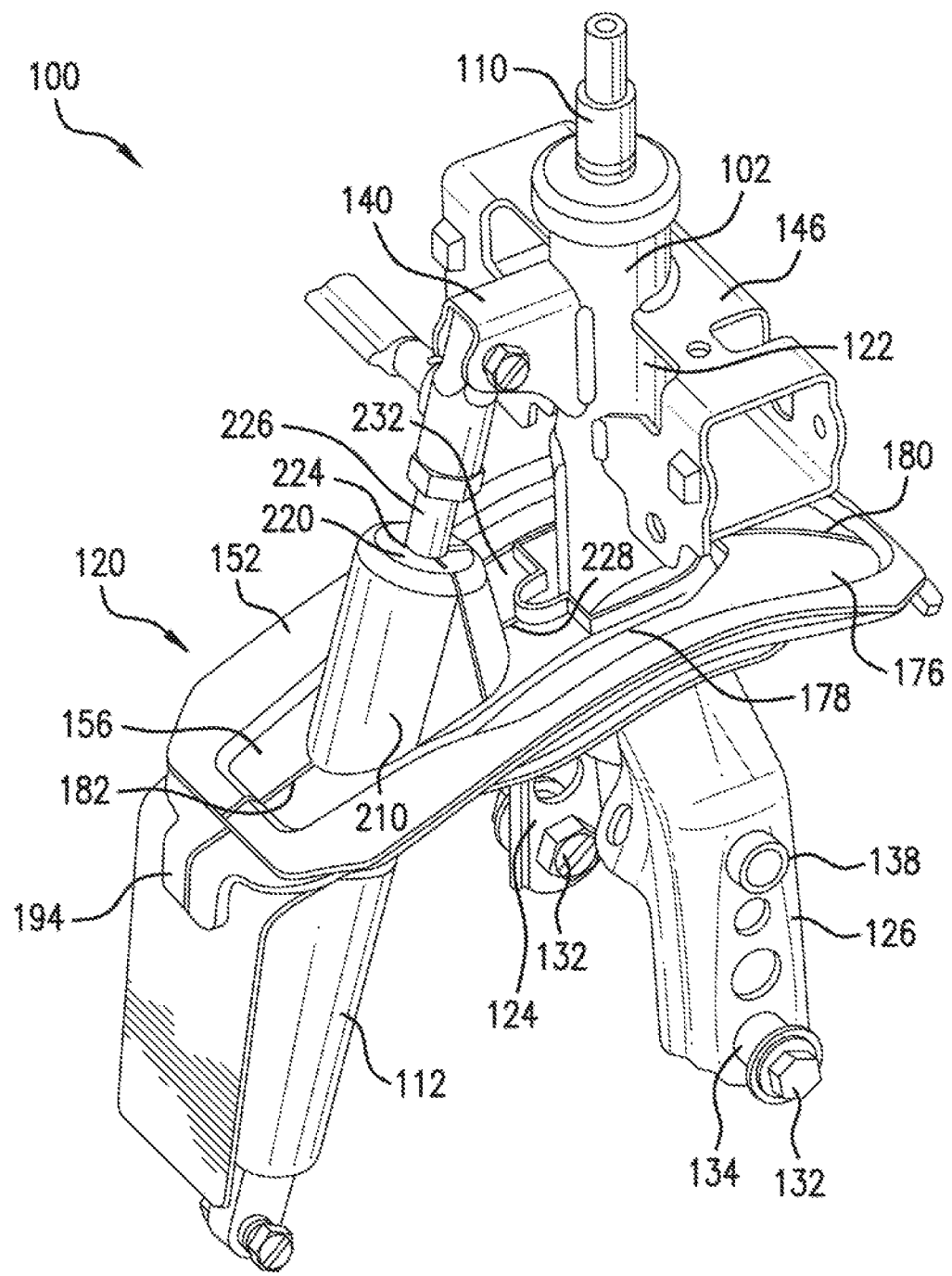
FIG. 1 is a perspective view of a tilt steering assembly for a vehicle including a column cover according to the present disclosure.
Figure 2:
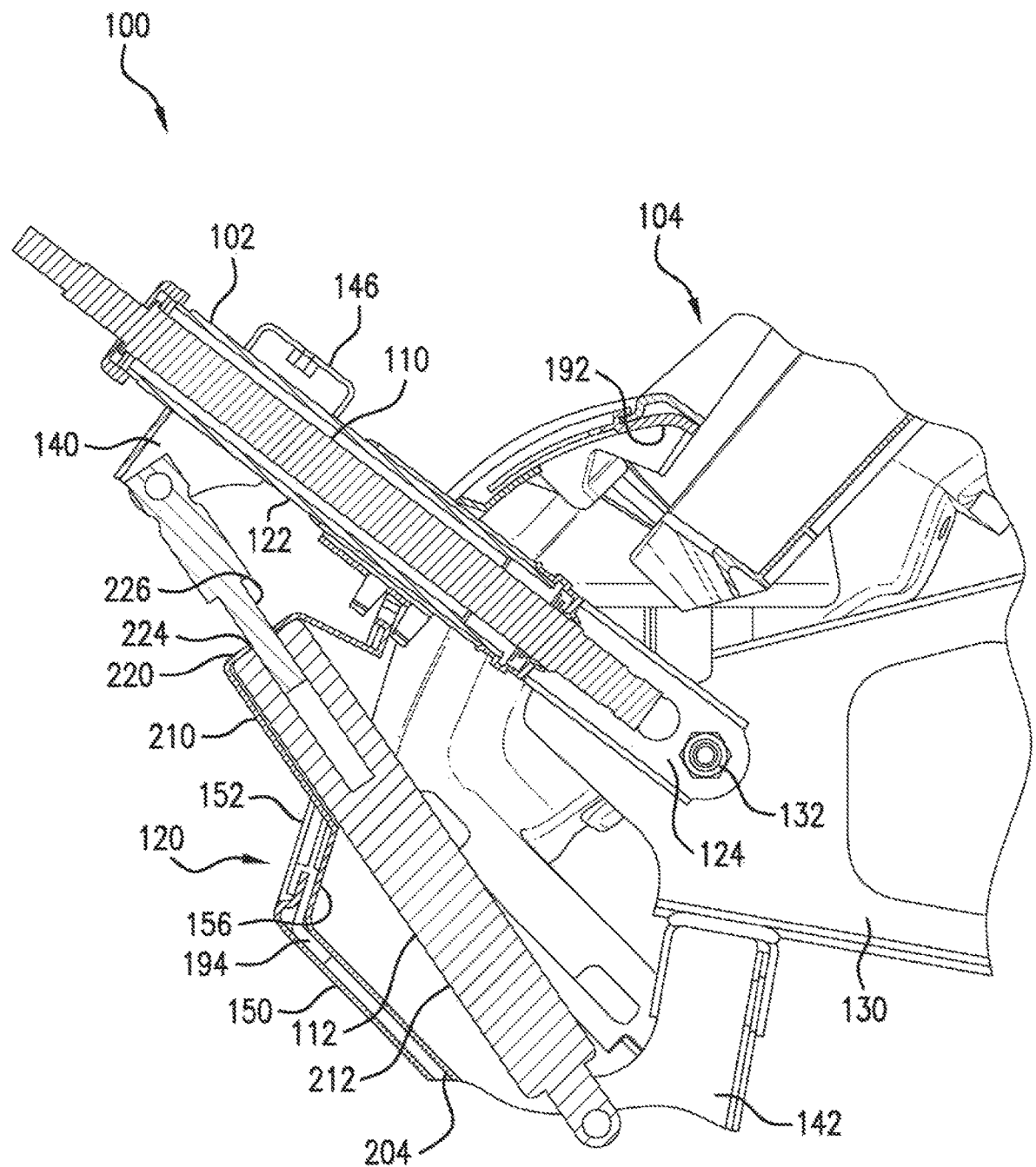
FIG. 2 is a cross-sectional view of the tilt steering assembly of FIG. 1 mounted to an instrument panel of the vehicle.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1 and 2 illustrate an exemplary tilt steering assembly 100 for a vehicle, for example, a four-wheel-drive off-road vehicle. The tilt steering assembly 100 generally comprises a tilting-type or a telescopic-type steering column 102 a position of which is adjustable relative to an instrument panel 104 in one of a vehicle front-rear direction and a vehicle up-down direction. The steering column 102 houses a steering shaft 110 to which a steering handle or wheel (not shown) is mounted. A free-lock type gas damper 112 is connected to the steering column 102 for generally maintaining the adjusted position of the steering column 102 relative to the instrument panel 104. An exemplary column cover 120 according to the present disclosure is configured to at least partially cover the steering column 102 and the damper 112.

As depicted, the steering column 102 is provided with a cylindrical tube member 122 housing the steering shaft 110, and left and right arm portions 124, 126 integrally fixed to the tube member 122 and provided in a vehicle-width direction. Each of the left and right arm portions 124, 126 is fastened to a column installation bracket 130 by a threaded fastener (e.g., a bolt 132). Bushing 134 receive the bolts 132 and provide relative rotation between the left and right arm portions 124, 126 and the column installation bracket 130. That is to say, the steering column 102 is supported on the column installation bracket 130 by the bolts providing tilt center shafts and is able to tilt relative to the column installation bracket 130 through the bushings 134 around the central axes defined by the bolts. Further depicted, stoppers 138 can be provided on the left and right arm portions 124, 126 to establish upper-limit and lower-limit positions for the tilting of the steering column 102 through contact with the column installation bracket 130.

The damper 112, which is adapted to arbitrarily maintain or lock the adjusted position of the steering column 102, is provided between the column installation bracket 130 and the tube member 122 of the steering column 102. An upper end of the damper 112 is installed to an upper damper-fastening bracket 140 provided on a upper portion of the tube member 122, and a lower end of the damper 112 is installed to a lower damper-fastening bracket 142 secured to the column installation bracket 130. Further depicted is a support bracket 146 adapted to support the upper portion of the tube member 122.

Figure 3:
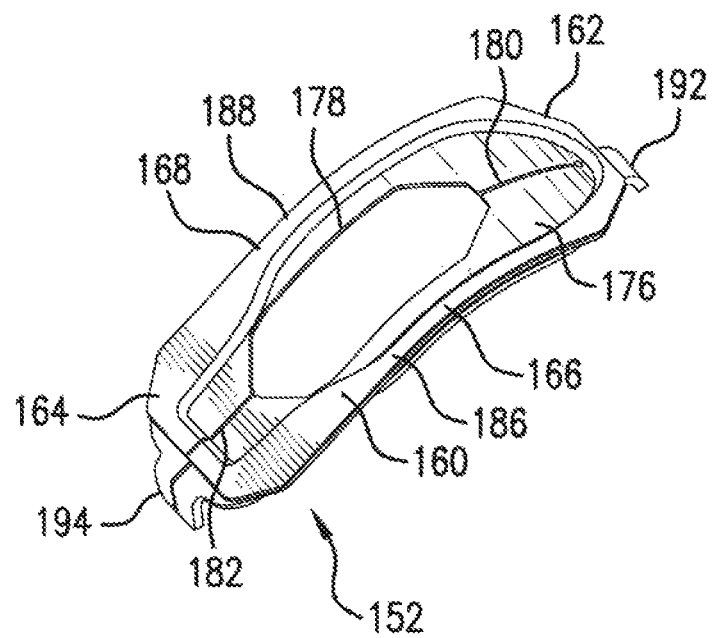
FIG. 3 is a perspective view of a cover member of the exemplary column cover.

With continued reference to FIGS. 1 and 2, the exemplary column cover 120 includes a lower skirt 150 adapted to be connected to the instrument panel 104, a flexible cover member 152 that extends from the lower skirt 150 to the instrument panel 104 to partially close an opening defined by the lower skirt and the instrument panel for the steering column 102 and damper 112, and a seal member 156 provided beneath the cover member 152. Exemplary features of the cover member 152 are best depicted in FIG. 3. As shown, the cover member 152 includes a body 160 having a first end portion 162, a second end portion 164 opposite the first end portion relative to a length dimension of the body 160, a first side portion 166, and a second side portion 168 opposite the first side portion relative to a width dimension of the body 160. The body 160 can includes a recessed portion 176 which is spaced inwardly from the first and second end portions and the first and second side portions. The recessed portion 176, which can have a reduced thickness relative to the remaining protons of the body, includes an aperture 178 elongated in the length dimension of the cover member 152. The cover member 152 further includes at least one slit provided as an extension of the aperture 178. The at least one slit allows for flexing of the cover member 152 during adjustment of the steering column 102. In the depicted aspect, the at least one slit is a first slit 180, and the cover member 152 includes a second slit 182 also provided as an extension of the aperture 178. The first and second slits 180, 182 are aligned in a top view of the cover member 152 along the length dimension of the cover member and are separated by the aperture 178. According to one aspect, one of the first and second slits 180, 182 extends through one of the first and second end portions 162, 164 of the cover member. As depicted, the first slit 180 is confined to the recessed portion 176, and the second slit 182 extends through the second end portion 164 to separate the second end portion 164 into first and second separated flaps 186, 188 which are interconnected at the opposite first end portion 162 of the cover member. This allows the cover member 152 to be easily fitted over the steering column 102 and damper 112, which both extend through the aperture 178. The cover member 152 is also provided with first and second mounting tabs 192, 194 which extend from the respective first and second end portions 162, 164. As best depicted in FIG. 2, the first mounting tab 192 is configured to be secured to the instrument panel 104, and the second mounting tab 194 is configured to be secured to the lower skirt 150. Therefore, the cover member 152 is fixed to the instrument panel 104.

Figure 6:
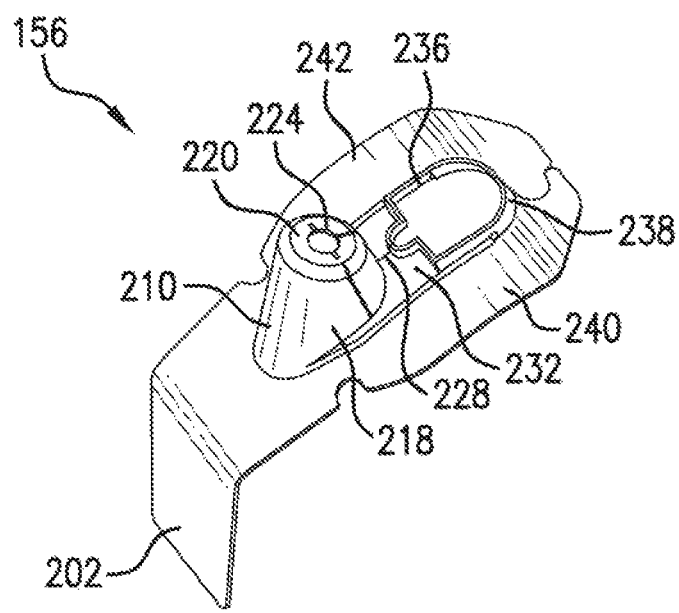
FIG. 6 is a perspective view of the seal member in an assembled condition.
Figure 4:
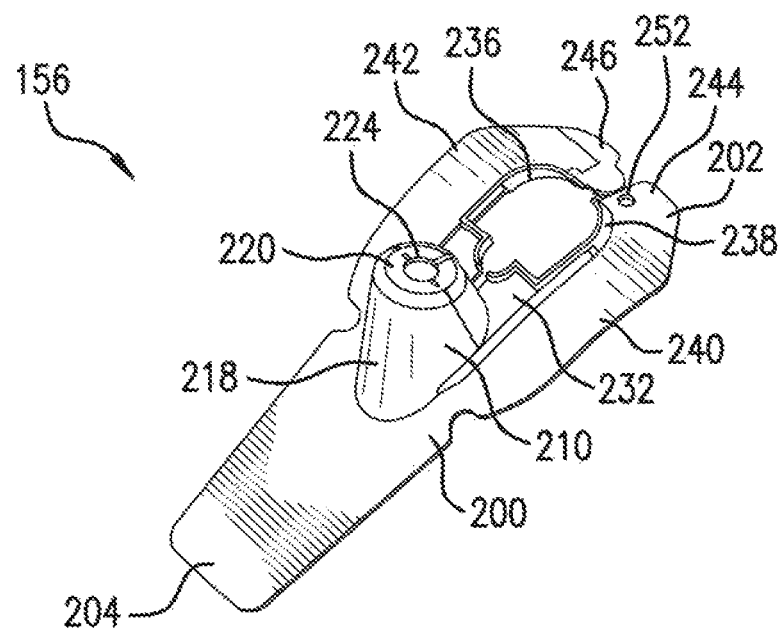
FIG. 4 is a perspective view of a seal member of the exemplary column cover in an unassembled condition.
Figure 5:
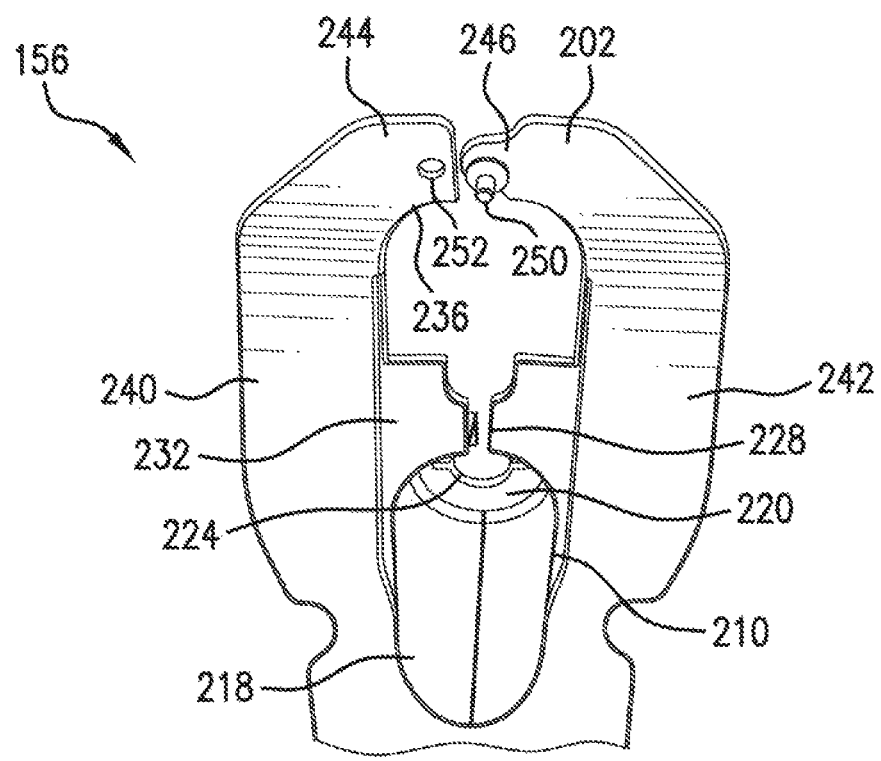
FIG. 5 is an enlarged partial perspective view of the seal member of FIG. 4.

FIGS. 4-6 best depict exemplary features of the seal member 156. The seal member 156 includes a body 200 having a first end portion 202 and a second end portion 204 opposite the first end portion relative to a length dimension of the body 200. A column 210 sized to receive therein a cylinder 212 of the damper 112 (see FIG. 2) extends outwardly from the body 200. The column 210, which can be centrally located between the first and second end portions 202, 204, includes a side wall 218 and an end face 220. The end face 220 is provided with an opening 224 sized to receive a piston 226 of the damper 112 (see FIGS. 1 and 2). A slit 228 extends from the opening 224, through the side wall 218, and through a recessed portion 232 provided on the body 200. An aperture 236 shaped to receive the steering column 102 extends through the recessed portion 232, and a fence 238 shaped to conform to a shape of the steering column 102 can surround the aperture 236. With the arrangement of the slit 228 and the aperture 236, the seal member 156 defines first and second arms 240, 242 sized to surround the steering column 102, and respective end portions 244, 246 of the first and second arms 240, 242 (which are located at the first end portion 202 of the seal member body 200) are configured to be releasably connected. By way of example, a pin 248 is provided on one of the end portions 244, 246 and a corresponding hole 250 is provided on the other of the end portions 244, 246; although, alternative manners for connecting the end portions 244, 246 are contemplated.

Figure 7:
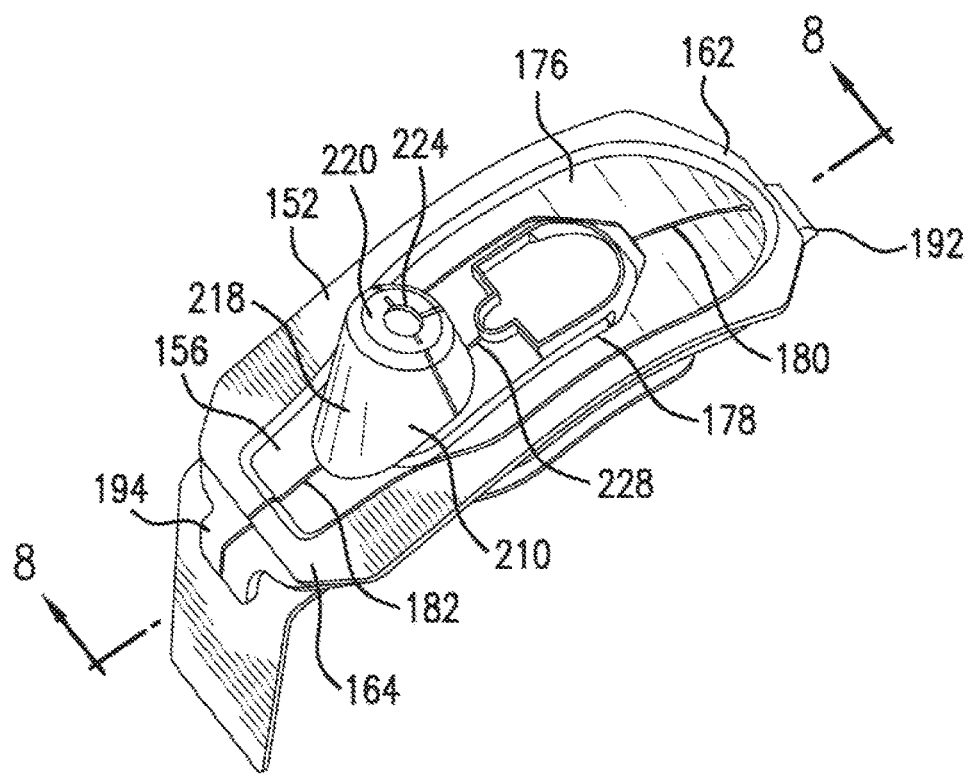
FIG. 7 is a perspective view of the seal member mounted to the cover member.
Figure 8:
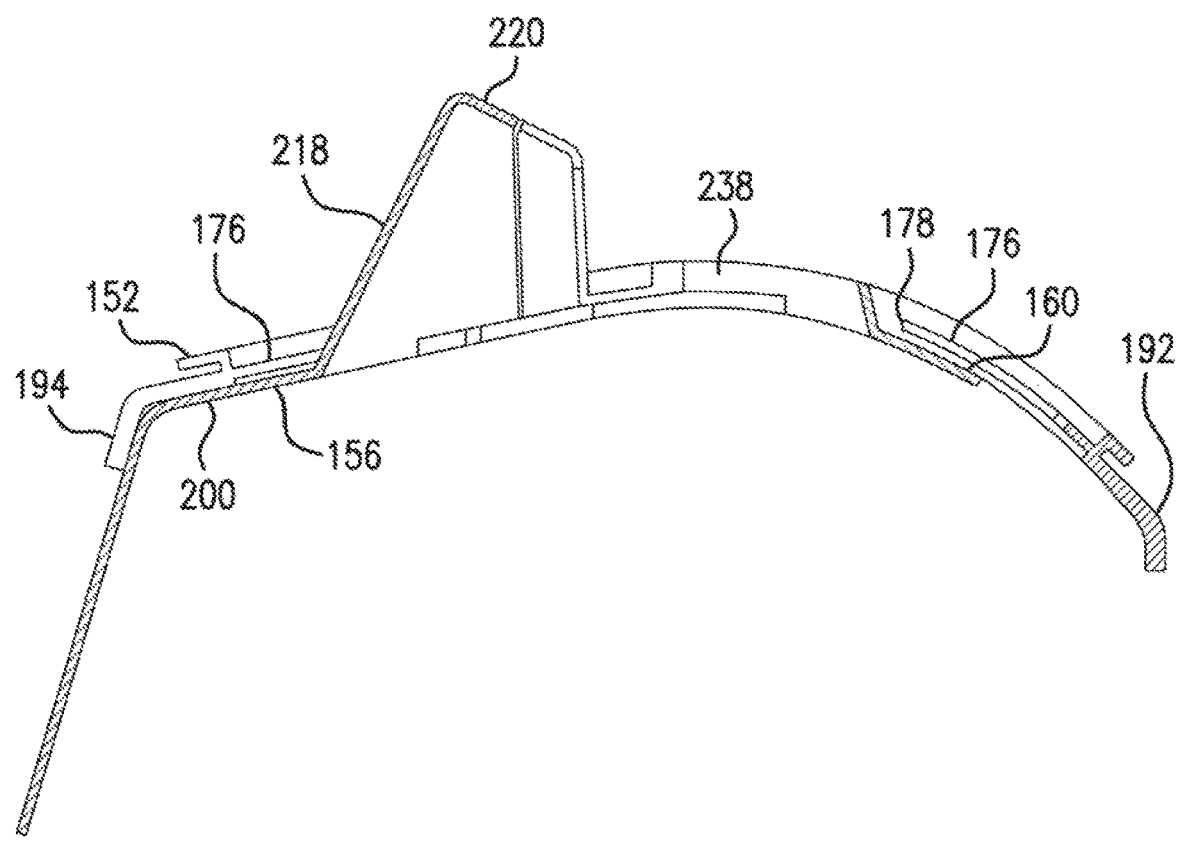
FIG. 8 is a cross-sectional view taken generally along line 8-8 of FIG. 7.

FIGS. 7 and 8 show the column cover 120 with the seal member 156 engaged to the cover member 152. The aperture 178 of the cover member 152 receives both the column 210 and the fence 238 of the seal member 156. The body 200 of the seal member 156 is pressed against the body 160 of the cover member 152. And, the first and second slits 180, 182 of the cover member 152 are aligned with the slit 228 of the seal member 156 in top view. Further depicted in FIG. 2, when assembled, the cover member 152 is fixed to the lower skirt 150 and the instrument panel 104. The seal member 156 is fitted over the damper 112, and the column 210 is sized such that the cylinder 212 of the damper is in constant direct contact with an inner surface of end face 220 of the column 210. The second end portion 204 of the seal member 156 is bent downward to press against an inner surface of, for example, the lower skirt 150, and this engagement ensures relative movement between the seal member 156 (via adjustment of the steering column 102) and the fixed cover member 152.

Figure 9:
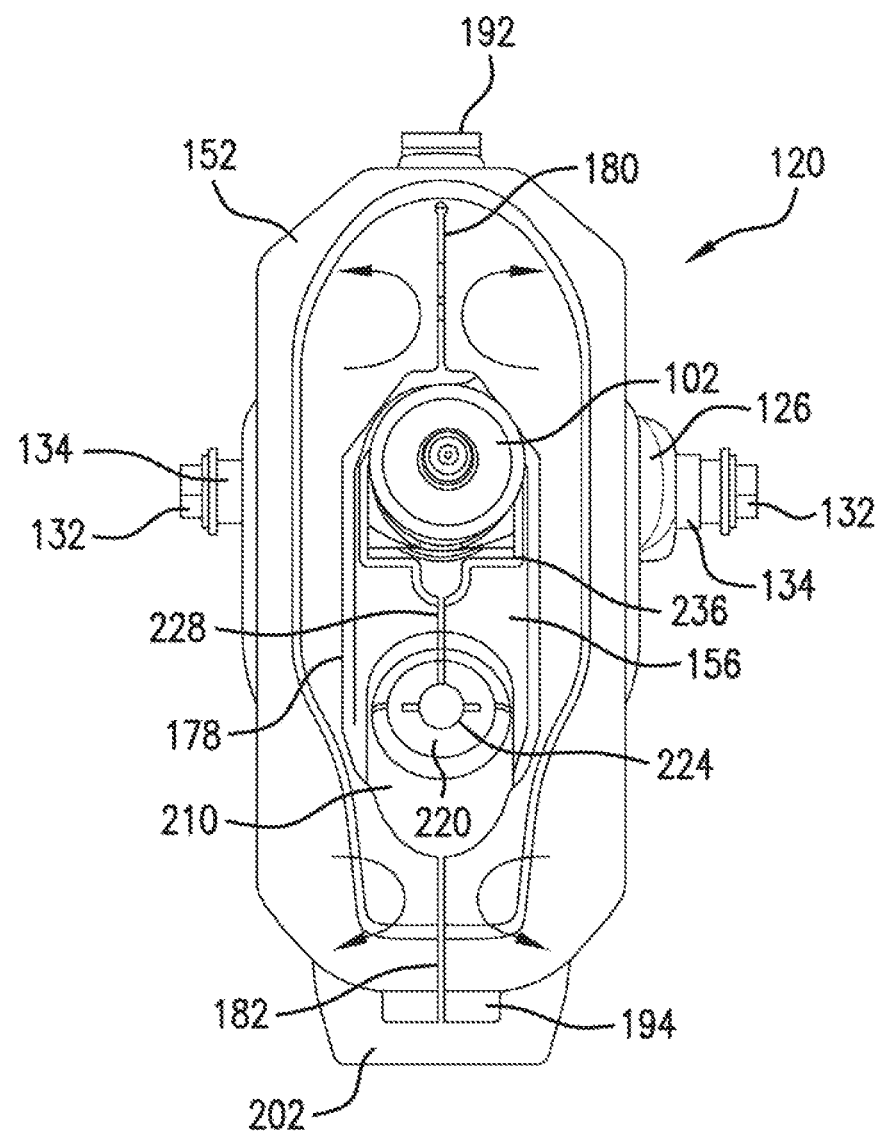
FIG. 9 is a perspective view of the tilt steering assembly of FIG. 2 showing outward flexing of the column cover caused by adjustment of a steering column of the tilt steering assembly.

Due to the high visibility of the steering wheel and surrounding instrument panel 104, aesthetics must be considered and it is therefore important to avoid gaps between the instrument panel 104 and column cover 120 during movement of the steering column 102, in a telescoping or tilting manner, for example. In FIGS. 2 and 9, the seal member 156 is in constant contact with and is moveable with the damper 112. As indicated previously, with the second end portion 204 of the seal member 156 pressed against the lower skirt 150, the damper 112 is constantly pushed against the end face 220 of the column 210. Therefore, the seal member 156 is moveable together with the steering column 102 relative to the cover member 152. During adjustment of the steering column 102, as the steering column 102 is moved though the aperture 178, the seal member 156 engages the cover member 152 and flexes the cover member 152 outwardly at the first and second slits 180, 182 (see the arrows in FIG. 9). However, this outward flexing of the cover member, in turn, creates visible gaps at the first and second slits 180, 182. To maintain the aesthetics of the tilt steering assembly 100, the seal member 156 is configured to press against the inner surface of the cover member 152 to close the gaps created by the flexing of the cover member. Therefore, an effective seal for the column cover 120 is achieved.

It will be appreciated that various of the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A tilt steering assembly for a vehicle comprising:
   a steering column a position of which is adjustable relative to an instrument panel in one of a vehicle front-rear direction and a vehicle up-down direction;
   a damper connected to the steering column for maintaining the position of the steering column relative to the instrument panel; and
   a column cover that at least partially covers the steering column and the damper, the column cover includes:
   a lower skirt connected to the instrument panel,
   a flexible cover member that extends from the lower skirt to the instrument panel to partially close an opening defined by the lower skirt and the instrument panel for the steering column and damper, the steering column and damper extending through the cover member, and
   a seal member provided beneath the cover member, the seal member is fitted over the damper and includes an opening sized to receive the column cover,
   wherein during adjustment of the steering column the cover member is configured to flex outwardly creating a gap for movement of the steering column and damper through cover member, and the seal member is configured to press against an inner surface of the cover member to close the gap created by the flexing of the cover member.

2. The tilt steering assembly of claim 1, wherein the cover member includes an aperture elongated in a length dimension of the cover member, the steering column and the damper extend through the aperture, the cover member further includes at least one slit provided as an extension of the aperture, the at least one slit allowing outward flexing of the cover member.

3. The tilt steering assembly of claim 2, wherein the cover member includes first and second slits aligned in a top view of the cover member along the length dimension of the aperture and separated by the aperture.

4. The tilt steering assembly of claim 3, wherein one of the first and second slits extends through an end portion of the cover member to separate the end portion into first and second separated flaps which are interconnected at an opposite end portion of the cover member.

5. The tilt steering assembly of claim 2, wherein the seal member is configured to flex the cover member outwardly at the at least one slit as the steering column is adjusted, the at least one slit defines the gap.

6. The tilt steering assembly of claim 5, wherein the seal member is configured to close the at least one slit of the cover member.

7. The tilt steering assembly of claim 1, wherein the seal member includes a column sized to receive therein a cylinder of the damper, an end face of the cylinder of the damper is in constant direct contact with an inner surface of the column of the seal member.

8. The tilt steering assembly of claim 1, wherein the seal member includes first and second arms sized to surround the steering column, respective end portions of the first and second arms configured to be releasably connected.

9. The tilt steering assembly of claim 1, wherein the cover member is fixed to the lower skirt and the instrument panel.

10. The tilt steering assembly of claim 9, wherein the seal member is fixed to the damper and is moveable together with the steering column relative to the cover member.

11. The tilt steering assembly of claim 10, wherein the seal member includes an elongated flange configured to press against an inner surface of the lower skirt.

12. A vehicle assembly comprising:
    an instrument panel;
    a steering column housing a steering shaft, a position of the steering column is adjustable relative to the instrument panel in one of a vehicle front-rear direction and an up-down direction;
    a damper connected to the steering column for maintaining the position of the steering column relative to the instrument panel; and
    a column cover that at least partially covers the steering column and the damper, the column cover includes:
    a lower skirt connected to the instrument panel,
    a flexible cover member that extends from the lower skirt to the instrument panel to partially close an opening defined by the lower skirt and the instrument panel for the steering column and damper, the flexible cover member includes an aperture elongated in a length dimension of the cover member and at least one slit provided as an extension of the aperture, the aperture sized to receive therethrough both the steering column and the damper, and
    a seal member provided beneath the cover member, the seal member is fitted over the damper and includes an opening sized to receive the column cover,
    wherein during adjustment of the steering column the cover member is configured to flex outwardly at the at least one slit creating a gap for movement of the steering column and damper through cover member, and the seal member is configured to press against an inner surface of the cover member to close the gap created by the flexing of the cover member.

13. The vehicle assembly of claim 12, wherein the cover member includes first and second slits aligned in a top view of the cover member along the length dimension of the aperture and separated by the aperture.

14. The vehicle assembly of claim 12, wherein the seal member includes a column sized to receive therein a cylinder of the damper, and includes first and second arms sized to surround the steering column, respective end portions of the first and second arms configured to be releasably connected.

* * * * *